(12) United States Patent
Blaxland

(10) Patent No.: US 8,920,200 B2
(45) Date of Patent: Dec. 30, 2014

(54) CONNECTOR FOR MOUNTING AN UNDERWATER POWER GENERATOR

(75) Inventor: Drew Blaxland, Singapore (SG)

(73) Assignee: Atlantis Resources Corporation Pte, Singapore (SG)

( * ) Notice: Subject to any disclaimer, the term of this patent is extended or adjusted under 35 U.S.C. 154(b) by 72 days.

(21) Appl. No.: 13/502,593

(22) PCT Filed: Oct. 26, 2010

(86) PCT No.: PCT/AU2010/001427
§ 371 (c)(1),
(2), (4) Date: Apr. 18, 2012

(87) PCT Pub. No.: WO2011/050403
PCT Pub. Date: May 5, 2011

(65) Prior Publication Data
US 2012/0202369 A1     Aug. 9, 2012

(30) Foreign Application Priority Data

Oct. 27, 2009   (AU) .................................. 2009905258

(51) Int. Cl.
| | | |
|---|---|---|
| H01R 11/22 | (2006.01) | |
| F03B 13/26 | (2006.01) | |
| F03B 17/06 | (2006.01) | |
| F03B 11/06 | (2006.01) | |
| F03B 13/10 | (2006.01) | |

(52) U.S. Cl.
CPC ............ *F03B 13/264* (2013.01); *F03B 17/061* (2013.01); *F05B 2240/57* (2013.01); *Y02E 10/28* (2013.01); *F05B 2240/50* (2013.01); *F03B 11/06* (2013.01); *F03B 13/10* (2013.01); *F05B 2240/97* (2013.01)

USPC ........................................................ 439/848

(58) Field of Classification Search
USPC ......... 439/314, 321, 324, 333, 335, 617, 680, 439/818, 827, 846, 848, 851
See application file for complete search history.

(56) References Cited

U.S. PATENT DOCUMENTS

| 1,025,929 A | 5/1912 | Snook |
|---|---|---|
| 1,371,836 A | 10/1919 | Antz et al. |

(Continued)

FOREIGN PATENT DOCUMENTS

| CA | 2 217 826 | 12/2001 |
|---|---|---|
| CA | 2 438 041 A1 | 2/2002 |

(Continued)

OTHER PUBLICATIONS

Sharkh, SM Abu, et al., "Performance of an Integrated Water Turbine PM Generator," Proceedings of the 14th Interntional Symposium on Power Semiconductor Devices & ICS, pp. 486-491, Apr. 2002.

(Continued)

*Primary Examiner* — Tho D Ta

(57) ABSTRACT

A connector (17) is provided to mount a power generation unit of an underwater power generator to a base assembly. The connector comprises (17) a lower connector portion (72) having a stem (62) projecting upwardly and having a tapering profile and an upper connector portion (70) having an inwardly and upwardly extending recess (60). At least one generally cylindrical pin (61) extends radially inwardly into the recess (60) and at least one groove (64) is formed in the stem (62). The groove (64) is configured to allow the pin (61) to travel along the groove (64) as the stem (62) is axially inserted into the recess (60).

12 Claims, 8 Drawing Sheets

(56) References Cited

U.S. PATENT DOCUMENTS

| | | | |
|---|---|---|---|
| 2,280,148 A | 4/1942 | Gardner | |
| 3,139,166 A | 6/1964 | Berlyn | |
| 3,464,357 A | 9/1969 | Duport et al. | |
| 3,604,942 A | 9/1971 | Nelson | |
| 3,851,994 A | 12/1974 | Seippel | |
| 3,942,231 A | 3/1976 | Whitaker | |
| 3,986,787 A | 10/1976 | Mouton, Jr. et al. | |
| 3,986,792 A | 10/1976 | Warner | |
| 4,021,135 A | 5/1977 | Pedersen et al. | |
| 4,064,403 A | 12/1977 | Miller | |
| 4,075,500 A | 2/1978 | Oman et al. | |
| 4,078,388 A | 3/1978 | Atencio | |
| 4,109,477 A | 8/1978 | Vogel | |
| 4,207,015 A | 6/1980 | Atencio | |
| 4,245,875 A * | 1/1981 | Shaffer et al. | 439/144 |
| 4,256,970 A | 3/1981 | Tomassini | |
| 4,258,271 A | 3/1981 | Chappell et al. | |
| 4,324,985 A | 4/1982 | Oman et al. | |
| 4,352,989 A | 10/1982 | Gutierrez Atencio | |
| 4,397,578 A | 8/1983 | Inman | |
| 4,523,878 A | 6/1985 | Richart et al. | |
| 4,524,285 A | 6/1985 | Rauch | |
| 4,531,888 A | 7/1985 | Buchelt | |
| 4,594,474 A | 6/1986 | Spinner | |
| 4,613,279 A | 9/1986 | Corren et al. | |
| 4,722,665 A | 2/1988 | Tyson | |
| 5,069,580 A | 12/1991 | Herwig et al. | |
| 5,440,176 A | 8/1995 | Haining | |
| 5,474,425 A | 12/1995 | Lawlor | |
| 5,506,453 A | 4/1996 | McCombs | |
| 5,575,620 A | 11/1996 | Haller et al. | |
| 5,685,730 A * | 11/1997 | Cameron et al. | 439/335 |
| 5,921,745 A | 7/1999 | Round et al. | |
| 5,929,531 A | 7/1999 | Lagno | |
| 5,954,474 A | 9/1999 | Fisher et al. | |
| 6,013,955 A | 1/2000 | dos Santos Costa | |
| 6,036,443 A | 3/2000 | Gorlov | |
| 6,091,161 A | 7/2000 | Dehlsen et al. | |
| 6,152,684 A | 11/2000 | Ferme et al. | |
| 6,402,477 B1 | 6/2002 | Cybularz et al. | |
| 6,476,513 B1 | 11/2002 | Gueorguiev | |
| 6,533,536 B1 | 3/2003 | Fisher, Jr. et al. | |
| 6,652,221 B1 | 11/2003 | Praenkel | |
| 6,846,160 B2 | 1/2005 | Saito et al. | |
| 6,864,594 B2 | 3/2005 | Seki | |
| 7,083,378 B2 | 8/2006 | Hur | |
| 7,088,012 B2 | 8/2006 | Gizara | |
| 7,095,597 B1 | 8/2006 | Cousineau | |
| 7,199,484 B2 | 4/2007 | Brashears | |
| 7,218,011 B2 | 5/2007 | Hiel et al. | |
| 7,352,074 B1 | 4/2008 | Pas | |
| 7,354,245 B2 | 4/2008 | Baba | |
| 7,372,172 B2 | 5/2008 | Winkler et al. | |
| 7,758,300 B2 | 7/2010 | Friesth | |
| 7,859,128 B2 | 12/2010 | Gibberd et al. | |
| 7,902,687 B2 | 3/2011 | Sauer et al. | |
| 7,988,479 B2 * | 8/2011 | Hankins et al. | 439/314 |
| 2002/0192068 A1 | 12/2002 | Selsam | |
| 2002/0197148 A1 | 12/2002 | Belinsky | |
| 2003/0126751 A1 | 7/2003 | Izumi | |
| 2004/0041405 A1 | 3/2004 | Seki | |
| 2004/0070210 A1 | 4/2004 | Johansen et al. | |
| 2004/0191068 A1 | 9/2004 | Richter et al. | |
| 2004/0219015 A1 | 11/2004 | Winkler et al. | |
| 2005/0029817 A1 | 2/2005 | Gizara | |
| 2005/0285407 A1 | 12/2005 | Davis et al. | |
| 2005/0286975 A1 | 12/2005 | Fonfrede et al. | |
| 2007/0007772 A1 | 1/2007 | Brashears | |
| 2007/0071606 A1 | 3/2007 | Borthwick et al. | |
| 2007/0191973 A1 | 8/2007 | Holzbauer et al. | |
| 2007/0231072 A1 | 10/2007 | Jennings et al. | |
| 2007/0231117 A1 | 10/2007 | Gokhman | |
| 2007/0231148 A1 | 10/2007 | Lehoczky | |
| 2007/0241566 A1 | 10/2007 | Kuehnle | |
| 2007/0284882 A1 | 12/2007 | Costin | |
| 2008/0056906 A1 | 3/2008 | Gray et al. | |
| 2008/0084068 A1 | 4/2008 | Shibata et al. | |
| 2008/0138206 A1 | 6/2008 | Corren | |
| 2008/0236159 A1 | 10/2008 | Tierney | |
| 2009/0045631 A1 | 2/2009 | Gibberd et al. | |
| 2009/0076661 A1 | 3/2009 | Pearson et al. | |
| 2009/0123283 A1 | 5/2009 | Corren et al. | |
| 2010/0084925 A1 | 4/2010 | Draper et al. | |
| 2010/0119309 A1 | 5/2010 | Gibberd et al. | |
| 2010/0133844 A1 | 6/2010 | Pearce | |
| 2011/0176915 A1 | 7/2011 | Keir et al. | |
| 2011/0210548 A1 | 9/2011 | Sevenster et al. | |
| 2012/0013129 A1 | 1/2012 | Cornelius et al. | |
| 2012/0133140 A1 | 5/2012 | Cornelius et al. | |
| 2012/0191265 A1 | 7/2012 | Keir | |
| 2012/0200084 A1 | 8/2012 | Blaxland et al. | |
| 2012/0267895 A1 | 10/2012 | Blaxland | |
| 2012/0280507 A1 | 11/2012 | Keir et al. | |
| 2014/0033624 A1 | 2/2014 | Blaxland et al. | |

FOREIGN PATENT DOCUMENTS

| | | |
|---|---|---|
| CN | 2528952 | 1/2003 |
| CN | 1484886 A | 3/2004 |
| CN | 1732617 | 2/2006 |
| CN | 101350589 A | 1/2009 |
| DE | 102 27 404 A1 | 1/2004 |
| DE | 10 2008 00038 | 9/2009 |
| DE | 10 2008 046 005 A1 | 3/2010 |
| EP | 0 020 207 A1 | 12/1980 |
| EP | 0 223 731 A1 | 5/1987 |
| EP | 1 205 422 A1 | 5/2002 |
| EP | 1878914 A2 | 9/2007 |
| EP | 1988282 A2 | 11/2008 |
| FR | 2 702 784 | 9/1994 |
| GB | 1 518 151 | 7/1978 |
| GB | 2 426 295 | 11/2006 |
| GB | 2 431 207 A | 4/2007 |
| GB | 2 431 628 A | 5/2007 |
| GB | 2 437 533 | 10/2007 |
| GB | 2 437 534 | 10/2007 |
| GB | 2 448 710 | 3/2009 |
| JP | 62-101736 | 5/1987 |
| JP | 06-264701 | 9/1994 |
| JP | 2617276 | 6/1997 |
| JP | 2001-020849 | 1/2001 |
| JP | 2002-256810 | 9/2002 |
| JP | 2003-226484 A1 | 8/2003 |
| JP | 2004-215345 | 7/2004 |
| JP | 2006-508290 | 3/2006 |
| JP | 2009-240021 | 10/2009 |
| JP | 2009-281288 | 12/2009 |
| KR | 20070059317 | 6/2007 |
| WO | WO 01/14739 A1 | 1/2001 |
| WO | WO 01/48374 A2 | 7/2001 |
| WO | WO 2004/022968 A1 | 3/2004 |
| WO | WO 2005/010353 A2 | 2/2005 |
| WO | WO 2005/061173 | 7/2005 |
| WO | WO 2006/052923 A1 | 5/2006 |
| WO | WO2007/125349 A2 * | 11/2007 |
| WO | WO 2007/125349 A2 | 11/2007 |
| WO | WO 2008/100157 A1 | 8/2008 |
| WO | WO 2008/129311 | 10/2008 |
| WO | WO 2005/045243 A1 | 5/2009 |
| WO | WO 2009/126995 A1 | 10/2009 |
| WO | WO 2010/003596 A1 | 1/2010 |
| WO | WO 2010/125476 A1 | 11/2010 |

OTHER PUBLICATIONS

Schönborn, et al., "Development of a Hydraulic Control Mechanism for Cyclic Pitch Marine Current Turbines," Renewable Energy, Pergamon Press, Oxford, GB, vol. 32, No. 4, pp. 662-679, Apr. 2006.

English Translation of Office Action for Korean Patent Application No. 10-2010-7025661, mailed Jul. 19, 2012.

Office Action for Canadian Patent Application No. 2,724,702, mailed Sep. 24, 2012.

Supplemental European Search Report for European Patent Application No. 09 73 2862, mailed Sep. 2, 2011.

(56) References Cited

OTHER PUBLICATIONS

Final Office Action for U.S. Appl. No. 12/993,645, mailed Dec. 5, 2012.
Supplemental European Search Report for European Patent Application No. 10769392.1, mailed Feb. 18, 2013.
Supplemental European Search Report for European Patent Application No. 10769393.9, mailed Feb. 28, 2013.
Supplemental European Search Report for European Patent Application No. 09732944.5, mailed Feb. 19, 2013.
Examination Report for Australian Patent Application No. 2010312315, issued Apr. 2, 2013.
International Search Report for International Application No. PCT/AU2009/000457, mailed May 12, 2009.
Written Opinion for International Application No. PCT/AU2009/000457, mailed May 12, 2009.
International Preliminary Report on Patentability for International Application No. PCT/AU2009/000457, mailed Apr. 19, 2010.
International Search Report for International Application No. PCT/AU2009/000458, mailed May 25, 2009.
Written Opinion for International Application No. PCT/AU2009/000458, mailed May 25, 2009.
International Preliminary Report on Patentability for International Application No. PCT/AU2009/000458, mailed Jul. 12, 2010.
International Search Report and Written Opinion for International Application No. PCT/IB2010/001364, mailed Oct. 7, 2010.
International Search Report and Written Opinion for International Application No. PCT/IB2010/001346, mailed Aug. 26, 2010.
International Preliminary Report on Patentability for International Application No. PCT/AU2010/001161, mailed Nov. 1, 2011.
International Search Report and Written Opinion for International Application No. PCT/AU2010/001426, mailed Dec. 7, 2010.
Written Opinion for International Application No. PCT/AU2010/001426, mailed Oct. 5, 2011.
International Preliminary Report on Patentability for International Application No. PCT/AU2010/001426, mailed Feb. 27, 2012.
International Search Report for International Application No. PCT/AU2010/001427, mailed Jan. 21, 2011.
Office Action for U.S. Appl. No. 12/993,645, mailed Mar. 29, 2012.
Swenson, W. J., "The Evaluation of an Axial Flow, Lift Type Turbine for Harnessing the Kinetic Energy in a Tidal Flow," Northern Territory Centre for Energy Research, Northern Territory University, Darwin, Australia, Sep. 1999.
Office Action for U.S. Appl. No. 13/502,591, mailed Aug. 30, 2013.
Final Office Action for U.S. Appl. No. 13/502,591, mailed Mar. 13, 2014.
International Preliminary Report on Patentability for International Patent Application No. PCT/AU2012/000503, mailed Mar. 13, 2013.
Office Action for U.S. Appl. No. 13/816,032, mailed Jan. 31, 2014.
Supplementary European Search Report and Opinion for European Patent Application No. 10 82 5849, issued Apr. 5, 2013.
Office Action for U.S. Appl. No. 13/816,032, mailed May 15, 2014.
English Translation of Japanese Office Action for Japanese Patent Application No. 2012-535546, mailed Aug. 7, 2014.
English Translation of Office Action for Korean Patent Application No. 10-2013-7032701, mailed Aug. 19, 2014.
English Translation of Office Action for Japanese Patent Application No. 2012-534502, mailed Aug. 7, 2014.

\* cited by examiner

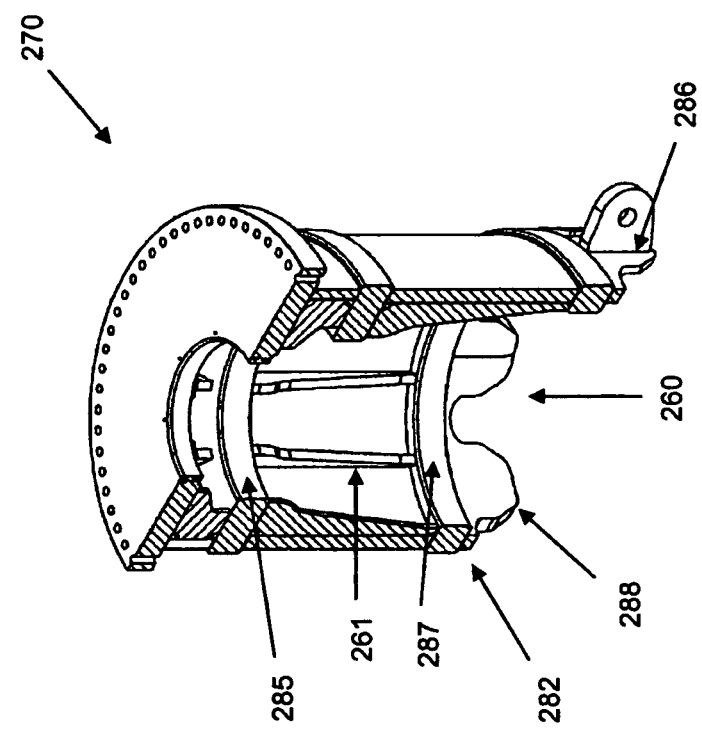
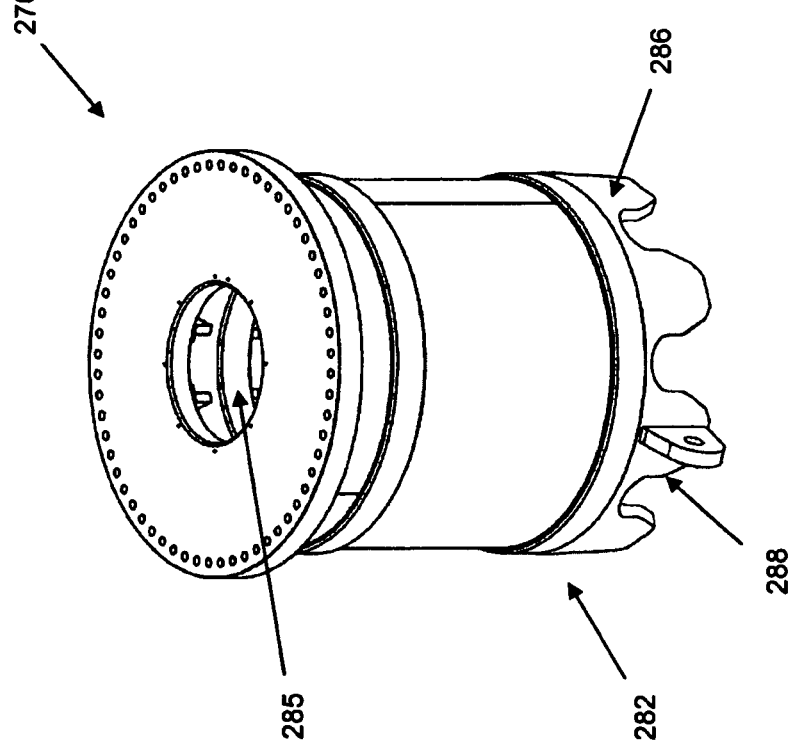

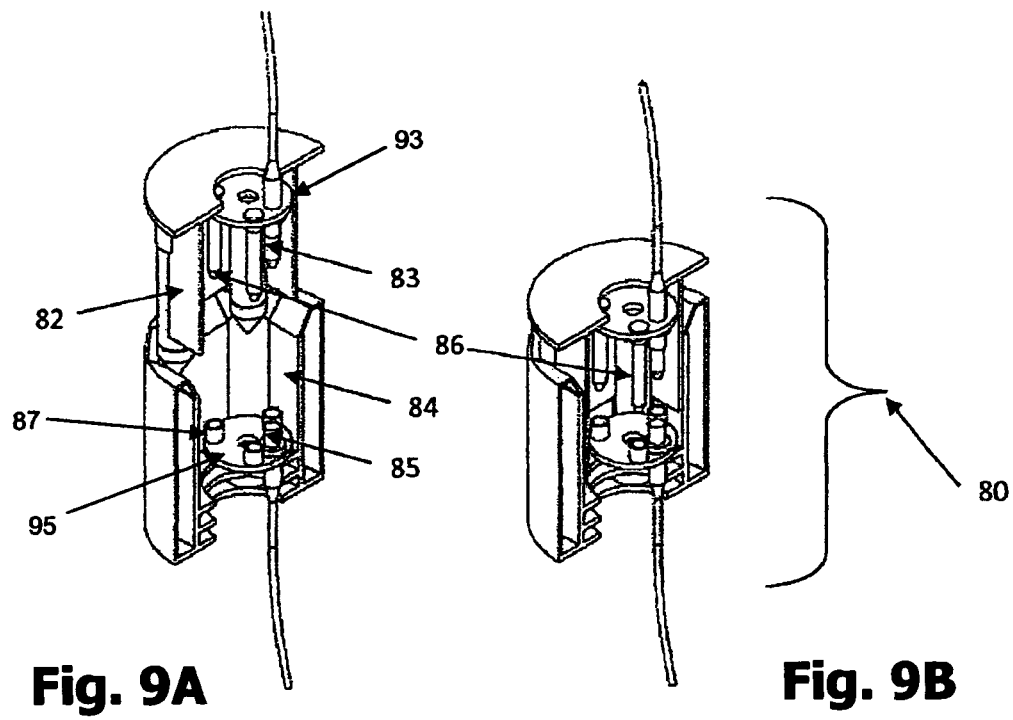
Fig. 9A  Fig. 9B
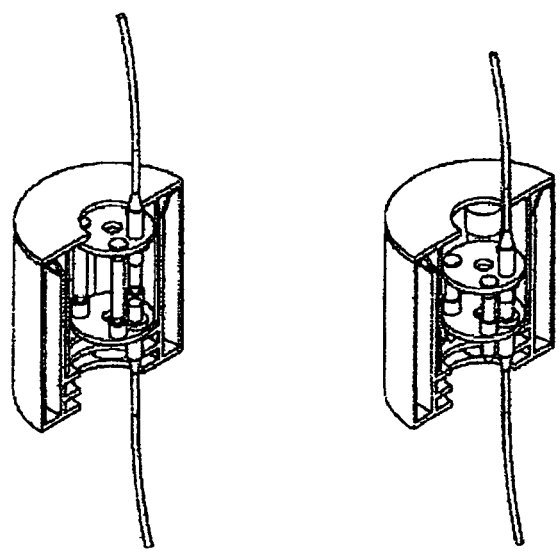
Fig. 9C  Fig. 9D

CONNECTOR FOR MOUNTING AN UNDERWATER POWER GENERATOR

CROSS REFERENCE TO RELATED APPLICATIONS

This application is a national stage application under 35 U.S.C. § 371 of International Patent Application No. PCT/AU2010/001427 filed Oct. 26, 2010, the disclosure of which is incorporated herein by reference in its entirety. International Patent Application No. PCT/AU2010/001427 claims priority to Australian Patent Application No. 2009905258, entitled "Turbine Assembly," filed Oct. 27, 2009. This application is related to Australian Patent No. 2010312315, entitled "Underwater Power Generator," filed Oct. 26, 2010 and issued May 9, 2013.

FIELD OF THE INVENTION

The present invention relates generally to underwater power generators for generating power from water flows, such as marine currents and tidal or river flows, and method and apparatus for their deployment.

BACKGROUND OF THE INVENTION

Known underwater power generators harness the power of marine currents and tidal flows to drive the rotation of turbine blades, which in turn drives a generator to generate power.

Optimum locations for operation of underwater power generators with suitable marine current and tidal flows are often less than optimum environments for deployment of the underwater power generators.

Many locations have strong currents making accurate deployment of underwater power generators difficult. As the generators need to undergo maintenance from time to time, the main generation unit typically needs to be raised above water for maintenance operations. Accordingly, the generation units must be disconnected from any base assembly and then reconnected once maintenance operations are complete.

Accurate deployment of the generation unit onto the base assembly is often difficult due to rugged floor terrain, wave movements when deploying from floating barges and underwater currents. Achieving correct alignment of the generation unit on the base assembly can be very difficult.

OBJECT OF THE INVENTION

It is an object of the present invention to substantially overcome or at least ameliorate one or more of the above disadvantages, or to provide a useful alternative.

SUMMARY OF THE INVENTION

In a first aspect, the present invention provides a connector adapted to mount a power generation unit of an underwater power generator to a base assembly, the connector comprising:
    a lower connector portion adapted to be secured to the base assembly, the lower connector portion having a stem projecting upwardly from a base to a tip and having a tapering profile;
    an upper connector portion adapted, to be secured to the generation unit, the upper connector portion having an inwardly and upwardly extending recess;
    at least one generally cylindrical pin extending radially inwardly into the recess; and
    at least one groove formed in the stem, the groove being configured to allow the pin to travel along the groove as the stem is axially inserted into the recess.

In a preferred embodiment, the connector includes a plurality of the pins and a corresponding plurality of the grooves.

Preferably, each groove extends from an upper opening to an end seat and wherein the pins are adapted to rest in the end seat when the upper connector portion is lowered onto the lower connector portion.

In a second aspect, the present invention provides a connector adapted to mount a power generation unit of an underwater power generator to a base assembly, the connector comprising:
    a lower connector portion adapted to be secured to the base assembly, the lower connector portion having a stem projecting upwardly from a base to a tip and having a tapering profile;
    an upper connector portion adapted to be secured to the generation unit, the upper connector portion having an inwardly and upwardly extending recess having a lower rim;
    an upwardly projecting flange ring provided adjacent to the base of the stem, the flange ring having a upper edge; and
    an downwardly depending skirt ring provided at the lower rim, the skirt ring having a lower edge;
    wherein the upper and lower edges are adapted to engage one another and inhibit axial rotation of the upper connector portion when the upper connector portion is lowered onto the lower connector portion.

Preferably, the upper and lower edges have complementary undulating profiles that inhibit axial rotation of the upper connector portion. Further preferably, the upper and lower edges are formed with a plurality of teeth.

In a preferred embodiment, the stem is provided with a plurality of radially outwardly projecting splines and the recess is provided with corresponding radially inwardly projecting splines, wherein the splines of the stem are adapted to engage the splines of the recess to inhibit axial rotation of the upper connector portion.

Preferably, the stem is provided with at least one bearing surface and the recess is provided with a corresponding bearing surface, wherein the bearing surface of the recess bears on the bearing surface of the stem when the upper connector portion is lowered onto the lower connector portion.

In a preferred embodiment, the connector further comprises a services connector adapted to connect service cabling between the lower and upper connector portions, the services connector comprising:
    a first services table having one or more cable connectors; and
    a second services table having one or more corresponding cable connectors;
    wherein at least one of the services tables is a turntable adapted to rotate relative to the other table to allow alignment of the corresponding cable connectors, prior to the tables being pressed together to join the corresponding cable connectors.

Preferably, at least one of the tables is provided with positioning pins and the other table is provided with positioning apertures arranged to receive the positioning pins when the tables are pressed together.

The services connector may be arranged internally of the connector or alternatively, the services connector may be arranged externally of the connector.

Preferably, the positioning pins and apertures are arranged asymmetrically on the turntables to ensure that the turntables can only be connected in a single orientation.

In a third aspect, the present invention provides an underwater power generator comprising:
- a base assembly;
- a generation unit adapted to be mounted on the base assembly; and
- a connector according to either the first or second aspect above.

In a fourth aspect, the present invention provides a system for aligning a generation unit of an underwater power generator on a pylon, the system comprising:
- at least two alignment cables attached to a take-up device;
- a pylon having at least two cable guides adapted to constrain lateral movement of a respective alignment cable; and
- a generation unit having at least two attachment points for attaching respective alignment cables;
- wherein each alignment cable passes from the take up device, through one of the cable guides and is attached to one of the attachment points, such that tension in the guide cables applied by the take-up device acts to draw the generation unit into axial and rotational alignment with the pylon.

In a fifth aspect, the present invention provides a system for axially aligning a generation unit of an underwater power generator on a pylon, the system comprising:
- at least two alignment cables, each cable attached to an anchor at one end and a take-up device at another end;
- an alignment tool adapted to be interferingly fitted on top of the generation unit as it is lowered onto the pylon the alignment tool having a pair of laterally extending arms, each arm having an aperture;
- wherein the anchors are positioned at a base of the pylon and each alignment cable passes from one of the anchors, through one of the apertures to the take-up device, such that tension in the alignment cables applied by the take-up device acts to draw the generation unit into axial and rotational alignment with the pylon.

BRIEF DESCRIPTION OF THE DRAWINGS

A preferred embodiment of the invention will now be described by way of specific example with reference to the accompanying drawings, in which:

FIG. 7 depicts an alternate embodiment of a first connector portion;

FIG. 8 is a cross sectional view of the first connector portion of FIG. 7;

FIGS. 9A to 9D depict stages of connection of a services connector of an underwater power generator;

DETAILED DESCRIPTION OF THE PREFERRED EMBODIMENTS

Figure 1:
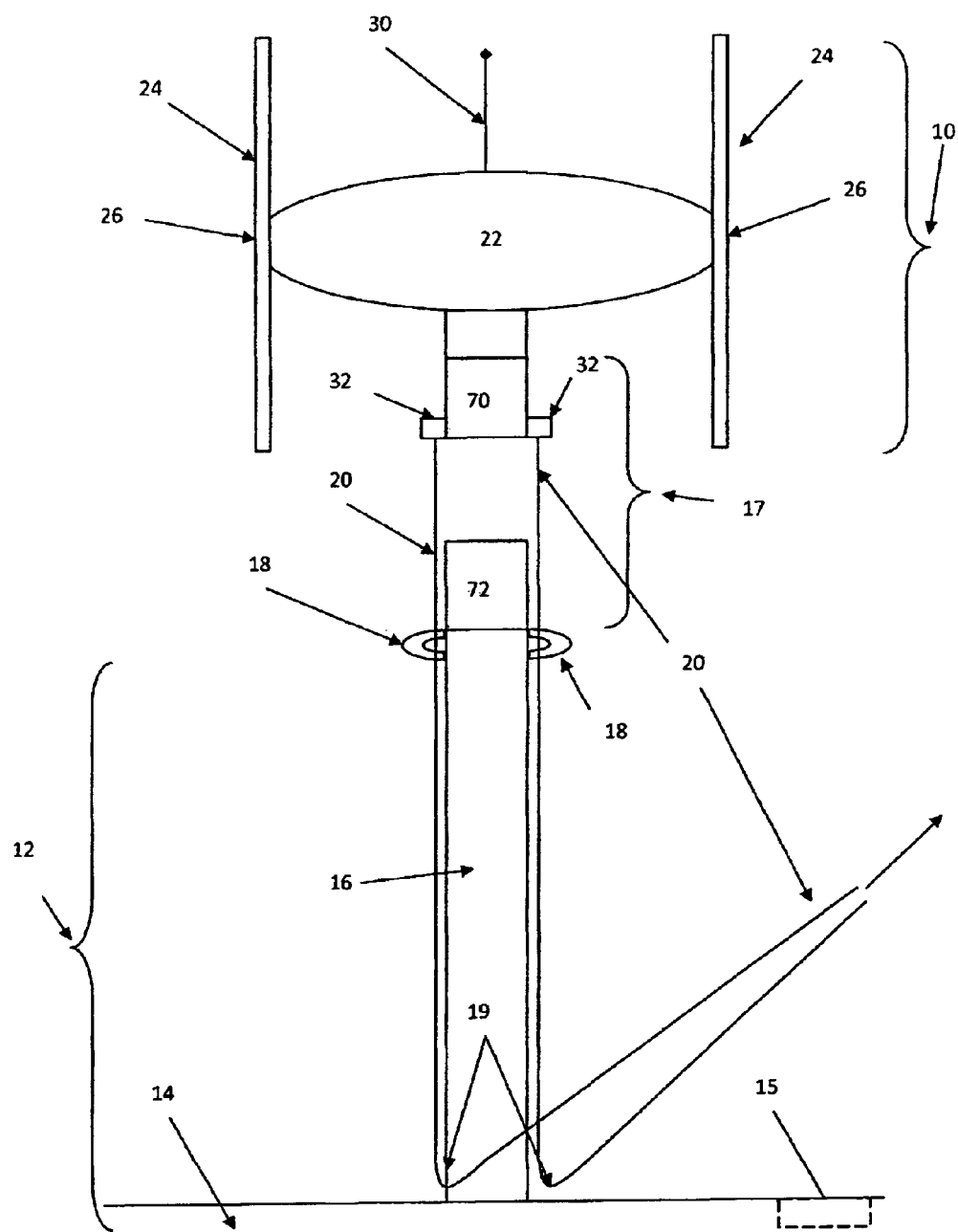
FIG. 1 depicts an underwater power generator during deployment.
Figure 2:
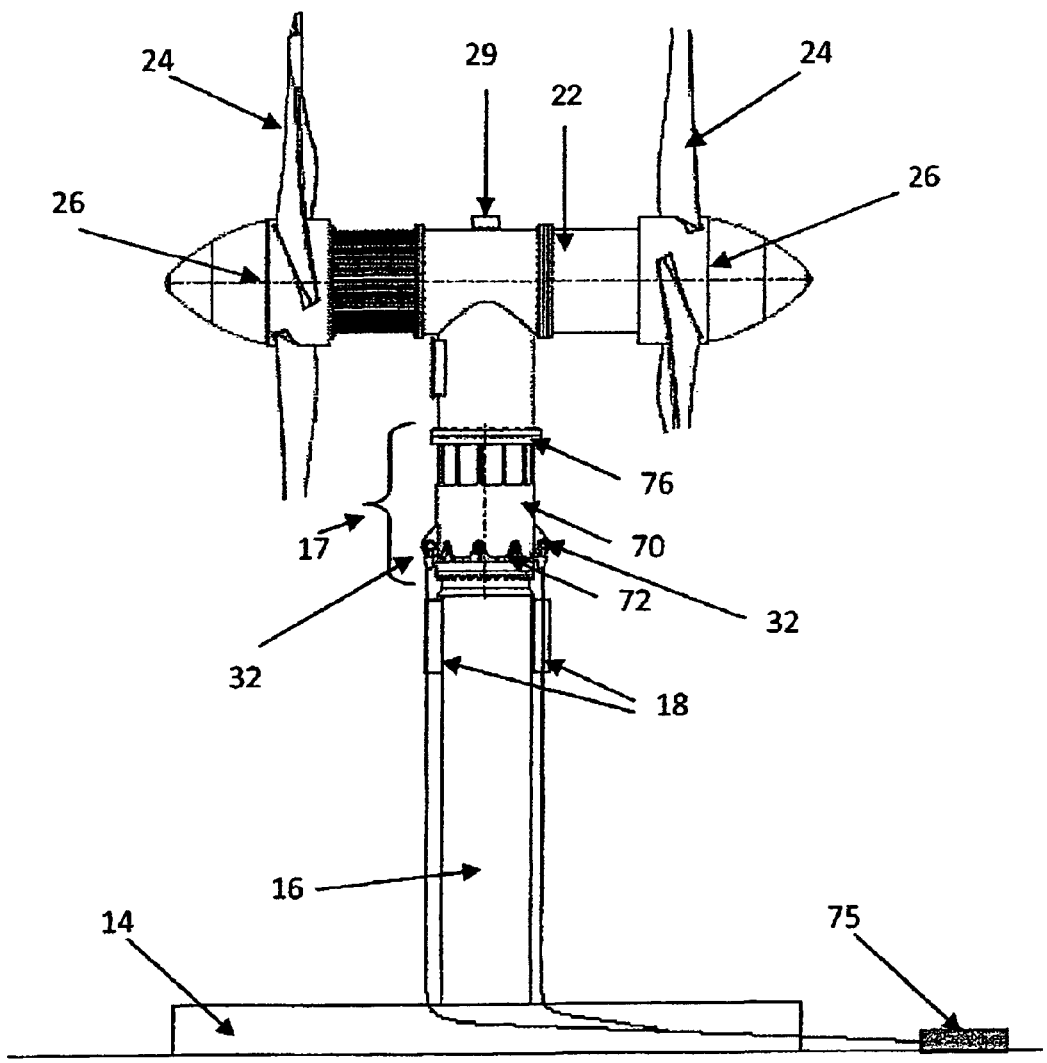
FIG. 2 depicts an underwater power generator after deployment.

FIG. 1 depicts an underwater power generator during deployment of a generation unit 10 for installation on a base assembly 12 comprising a base 14 and a pylon 16. Alternatively, the pylon 16 can be installed directly in the sea bed. FIG. 2 depicts the underwater power generator after deployment of the generation unit 10 on the base assembly 12.

The base 14 includes recesses 15 for receiving solid or fluid masses, such as for example concrete or spoil to improve stability. The support pylon 16 includes a pair of upper guides 18 and a pair of lower guides 19, which during deployment guide alignment cables 20. The alignment cables 20 during deployment help to align a connector 17 that comprises a first upper connector portion 70 and a second lower connector portion 72.

The generation unit 10 includes blades 24 mounted on a rotor 26 that allows the blades 24 to rotate in response to flowing water currents. The rotor 26 is mounted to a nacelle 22 which houses a generator. The generation unit 10 also includes a lobe 29 for lifting or lowering the generation unit 10 via a deployment cable. Attachment points 32 for the alignment cables 20 are provided on the upper connector portion 70 for alignment by the alignment cables 20 with the upper guides 18.

Figure 3:
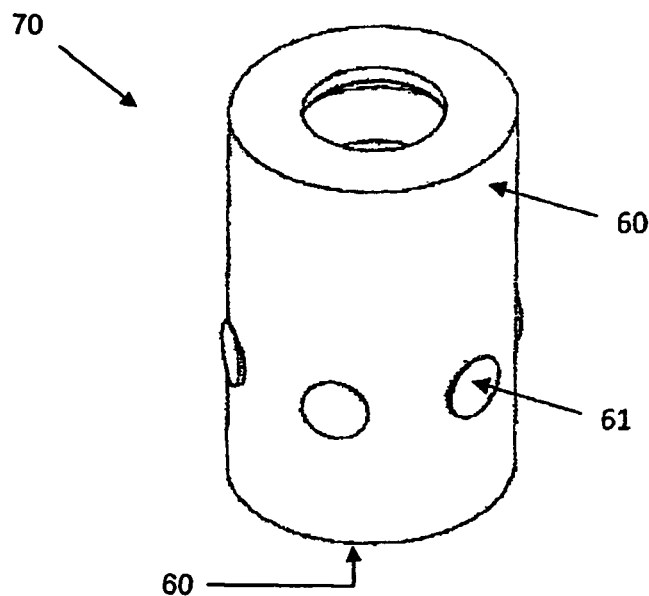
FIG. 3 depicts a first connector portion of an underwater power generator.
Figure 4:
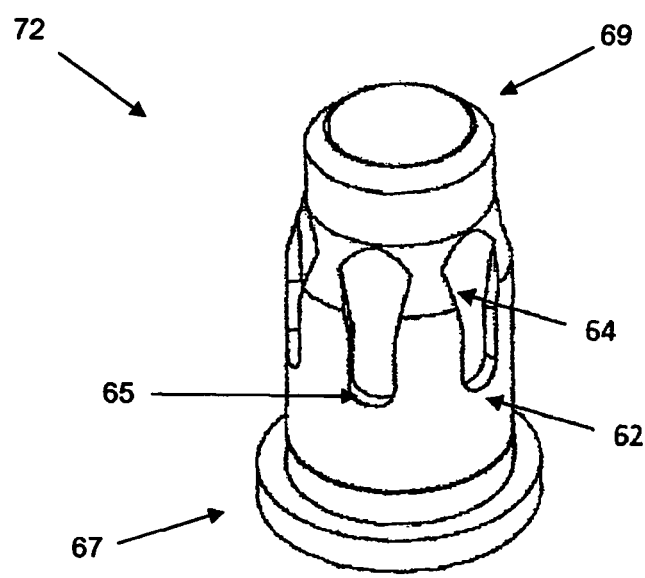
FIG. 4 depicts a second connector portion of an underwater power generator.

As shown in FIGS. 3 and 4, the connector 17 comprises upper and lower connector portions 70, 72 that are designed to be coupled together and held in location by gravity and interference fit.

The upper connector portion 70 includes an inwardly and upwardly extending recess 60 and radially inwardly projecting cylindrical pins 61. The lower connector portion 72 includes a stem 62 projecting upwardly from a base 67 to a tip 69 and having a generally tapering profile. A series of tapered grooves 64 are formed in the stem 62.

When the upper connector portion 70 is lowered axially over the lower connector portion 72 to couple the connector 17, the inwardly projecting cylindrical pins 61 in the recess 60 are received in, and travel along, the grooves 64 of the stem 62. Rotation is inhibited by the interference of the pins 61 in the grooves 64 when the connector 17 is coupled together.

Each groove 64 extends from an upper opening to an end seat 65 and the pins 61 rest in the end seats 65 when the upper connector portion 70 is lowered onto the lower connector portion 72.

Figure 5:
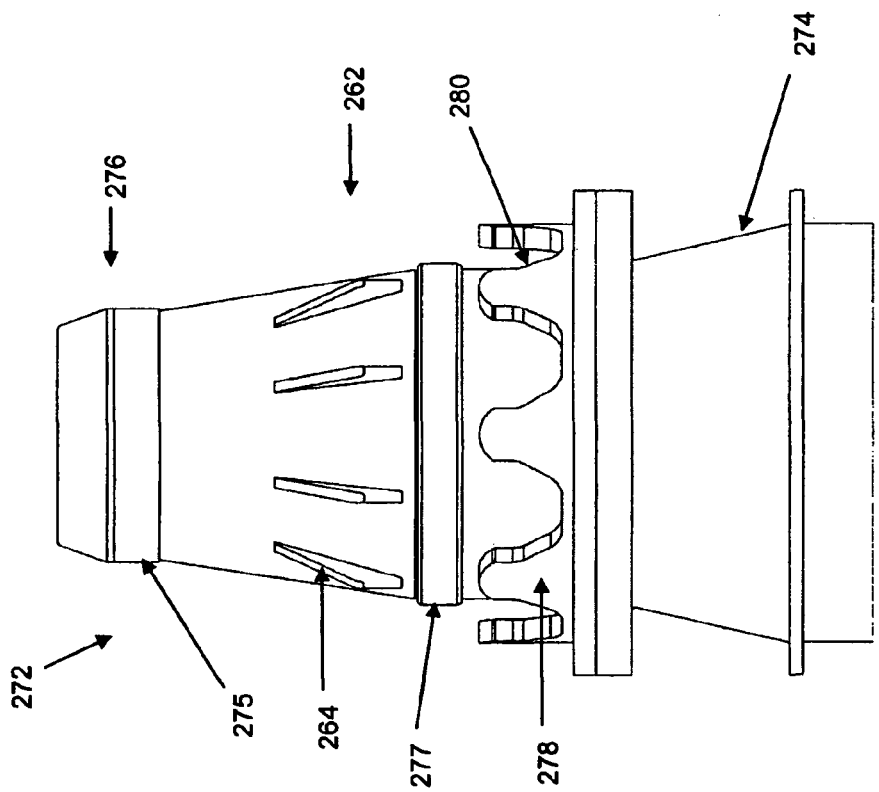
FIG. 5 depicts an alternate embodiment of a second connector portion.
Figure 6:
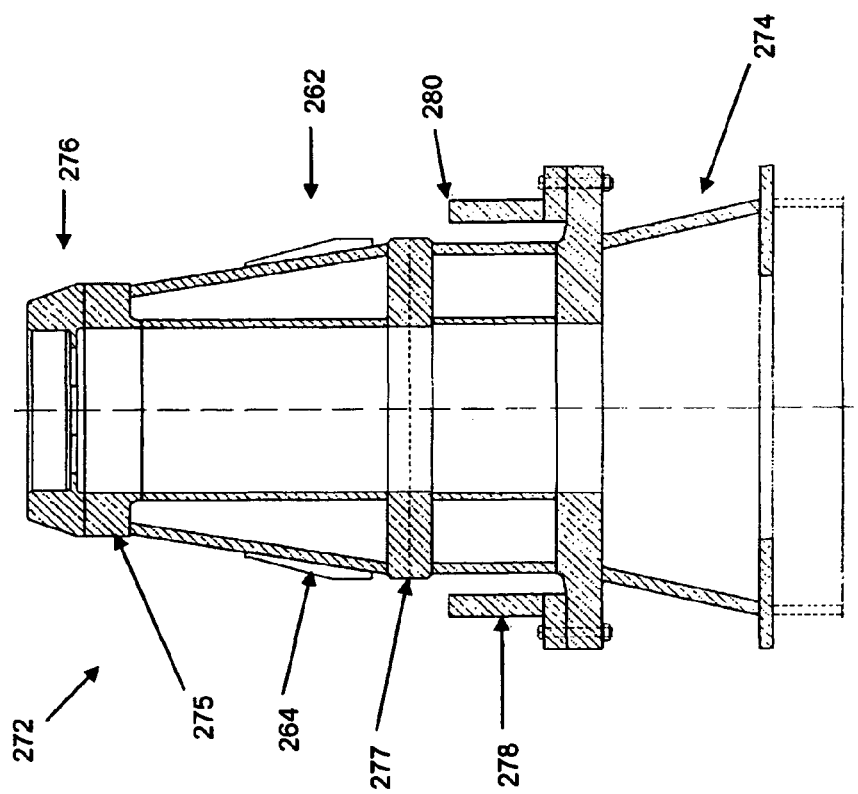
FIG. 6 is a cross sectional view of the second connector portion of FIG. 5.

An, alternate embodiment of the connector is shown in FIGS. 5 to 8. The connector comprises upper and lower connector portions 270, 272 that are designed to be coupled together similar to the embodiment described above. FIGS. 5 and 6 depict the lower connector portion 272 and FIGS. 7 and 8 depict the upper connector portion 270.

The lower connector portion 272 comprises a stem 262 that projects upwardly and has a intermittently tapering profile narrowing from a base 274 towards a tip 276. An upper bearing surface 275 and a lower bearing surface 277 are provided between the base 274 and the tip 276. The outer surface of the stem 262 is provided with a series of splines 264 that are spaced circumferentially around the stem 262. An upwardly projecting flange ring 278 is bolted to stem 262 adjacent to the base 274 and comprises an upright ring spaced outwardly from the base 274 of the stem 262 and having an undulating upper edge 280.

The upper connector portion 270 comprises a recess 260 extending inwardly and upwardly into the body of the upper connector portion 270. The recess 260 has an intermittently tapering profile narrowing from a lower rim 282 into the upper connector portion 270. An upper bearing surface 285 and a lower bearing surface 287 are provided between the rim 282 and the inner end of the recess 260. The inner surface of the recess 260 is provided with a series of radially inwardly projecting splines 261 that are spaced circumferentially around the recess 260. The rim 282 includes a skirt ring 286 that depends downwardly from the upper connector portion 270 and has an undulating lower edge 288, which is complementary to the undulating upper edge 280 of the flange ring 278.

The lower connector portion 272 is typically bolted to the top of a pylon in an upright presentation, while the upper connector portion 270 is typically bolted to the lower end of a generation unit of the underwater power generator. As the upper connector portion 270 is lowered onto the lower connector portion 272, the portions align axially due to the tapering profile. As the connector portions 270, 272 come together, the undulating lower edge 288 of the skirt ring 286 meshes with the complementary undulating upper edge 280 of the flange ring 278. As the flange ring 278 and the skirt ring 286 mesh together, the bearing surfaces 285, 287 of the upper connector portion 270 engage and bear on the bearing surfaces 275, 277 of the lower connector portion 272. The upper and lower edges 280, 288 are effectively formed with complementary teeth that are adapted to mesh together. The meshed upper and lower edges 280, 288 engage one another and inhibit axial rotation of the upper connector portion 270. Further, the inwardly projecting splines 261 of the upper connector portion 270 inhibit axial rotation by engaging the outwardly projecting splines 264 of the lower connector portion 272.

In this way, weight and torsional forces are transmitted through the connector without needing to clamp or latch the two portions 270, 272 together. The upper connector portion 270 is retained on the lower connector portion 272 merely by gravity and interference forces.

No locking mechanism, clamping or other fastening mechanism is required to retain the generation unit 10 on the base assembly 12 as gravity holds the generation unit 10 in place. This allows the generation unit 10 to be raised for maintenance simply by lifting the generation unit 10, which disengages the upper connector portion 70 from the lower connector portion 72.

In some embodiments, the upper connector portion 70 includes a mechanical restraint to augment the gravity connection; while still allowing disengagement from the lower connector portion 72 by simply lifting the generation unit 10. This provides an additional factor of safety for occasional impact loads.

As depicted in FIGS. 9A to 9D, the connector 17 also includes a services connector 80 for connecting service cabling such as electrical power and optical fibre lines between the upper and lower connector portions 70, 72. The services connector 80 includes a first turntable housing 82, having a first turntable 93 with male cable connectors 83, and a second turntable housing 84, having a second turntable 95 with female cable connectors 85 corresponding to the male cable connectors 83. The first and second turntable housings 82, 84 are connected during deployment by pressing the two turntable housings 82, 84 together, usually after coupling the upper and lower connector portions 70, 72 together. Positioning pins 86 and corresponding positioning apertures 87 are also provided to ensure correct alignment and by being asymmetrically offset only allow the turntable housings 82, 84 to be connected in a single orientation.

The turntables 93, 95 are rotatable relative to one another to allow the positioning pins 86 to be aligned with the positioning apertures 87, thereby aligning the male and female cable connectors 83, 85 before the turntable housings 82, 84 are pressed together, typically using hydraulic actuators. This connects the male and female cable connectors 83, 85 together and provides a services connection between the upper and lower connector portions 70, 72.

The services connector 80 can be provided internally of the connector 17 or alternatively, externally of the connector 17.

Returning to FIGS. 1 and 2, during deployment, the base assembly 12 is first lowered by cables to a sea bed. The alignment cables 20 extend through the lower and upper guides 19, 18 during the deployment. Spoil or other mass may be provided in the recesses 15 of the base 14 to improve stability. Alternatively, the pylon 16 can be installed directly in the sea bed. The pylon 16 is installed generally upright with the lower connector portion 72 attached to the top of the pylon 16.

The deployment cable 30 is then attached to generation unit 10 at the lobe 29 and the ends of the alignment cables 20, which already extend through the lower and upper guides 19, 18, are attached to the attachment points 32 of the upper connector portion 70. The other ends of the alignment cables 20 are attached to a take-up winch which could be arranged on a deployment barge or another platform or on the base 14 or sea bed.

The generation unit 10 is lowered by letting out the deployment cable 30. With the alignment cables 20 attached to the attachment points 32 and extending through the upper and lower guides 18, 19, a winch is used to draw in the alignment cables 20, which guides the generation unit 10 towards the base assembly 12.

With the generation unit 10 aligned over the base assembly 12, the upper connector portion 70 is lowered over the lower connector portion 72, so that the stem 62 is received in the recess 60. The pins 61 in the recess 60 of the upper connector portion 70 are received in, and travel along, the corresponding grooves 64 on the stem 62 of the lower, connector portion 72. The generation unit 10 is lowered until the pins 61 sit in the end is seats 65 of the grooves 64. When fully coupled, the upper connector portion 70 overlaps the lower connector portion 72 by approximately 2 meters in length.

The cable tension, cable playout length and speed are all monitored by sensors arranged adjacent to the winches. Communications networks communicate this data to a control system which controls the deployment of the generation unit 10 from the standby position shown in FIG. 1 to the deployed position shown in FIG. 2.

The connector 17 can be provided with the connector portions reversed such that the stem is on the upper portion and the recess is on the lower portion. However, the arrangement described is preferred because when disengaged from the upper portion, the recess if located on the lower portion would be vulnerable to being clogged with silt and marine growth.

A separate rotation device may be disposed in the pylon 16 or in the upper connector portion 70 to rotate the generation unit 10 to align with prevailing current flows.

The upper connector portion 70 can be aligned with the lower connector portion 72 in any of the multiple alignments determined by the number of pins 61 and corresponding grooves 64. By using different pairs of attachment points 32, the generation unit 10 can be lowered in any of the multiple alignments. A rotatable flange connection 76 between the upper connector portion 70 and the generation unit 10 also allows selective orientation of the generation unit 10 relative to the upper connector portion 70. These features are employed to correctly align the generation unit 10 with the prevailing current flow.

The blades 24 may be provided in one or two rotor sets and may be bi-directional or mono-directional. In the latter case of one rotor set, a rotation device will be desirable to provide efficient harnessing of the flow.

Once full deployment has been achieved, the deployment cable 30 is detached from the generation unit 10. The ends of the alignment cables 20 that are attached to the take-up winch are detached and reattached to an anchor 75 or mooring block. Some chain may be attached to provide absorption of movement.

As depicted in FIGS. 9A to 9D, hydraulic power is then used to join the turntable housings 82, 84 of the services connector 80. In order to ensure that like services are connected to like services, the positioning pins 86 must be correctly aligned with the positioning apertures 87 in order to allow the turntable housings 82, 84 to be joined. To ensure the exact alignment and integrity of the services connector 80, cameras and other recording instruments are utilised.

The second turntable housing 84 includes a void of square cross section with chamfered corners. The first turntable housing 82 includes posts disposed at spaced apart corners so as to inhibit rotation between the first and second turntable housings 82, 84.

Alignment facilitators are depicted on the first and second turntable housings 82, 84 to facilitate alignment and these are in the form of chamfers or lead-in portions.

Figure 10:
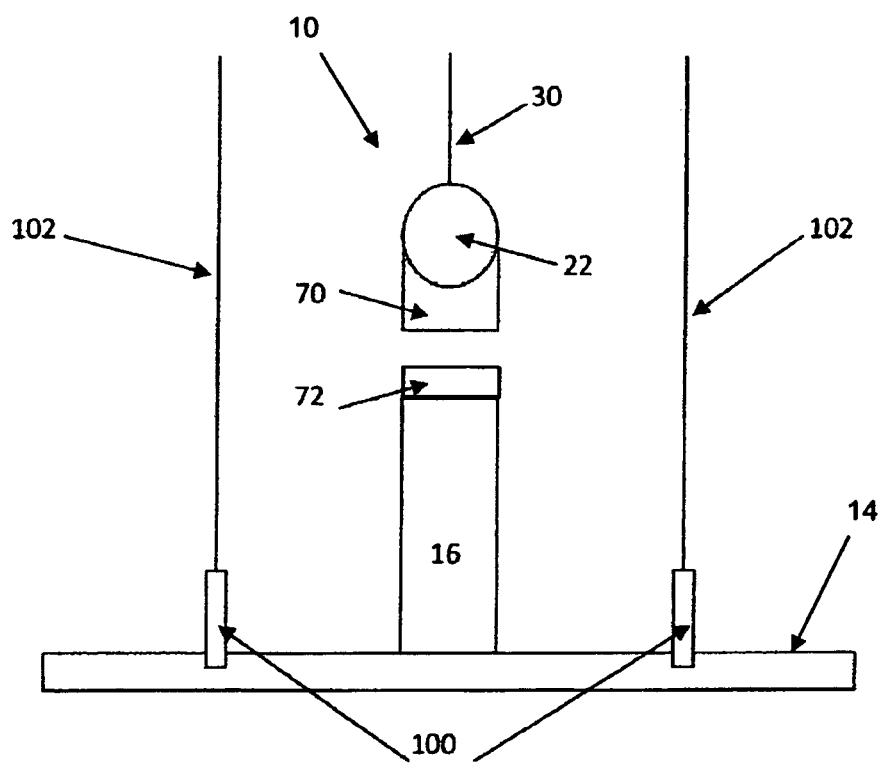
FIG. 10 is a side elevation view of an alignment system for aligning a generation unit and a base assembly.
Figure 11:
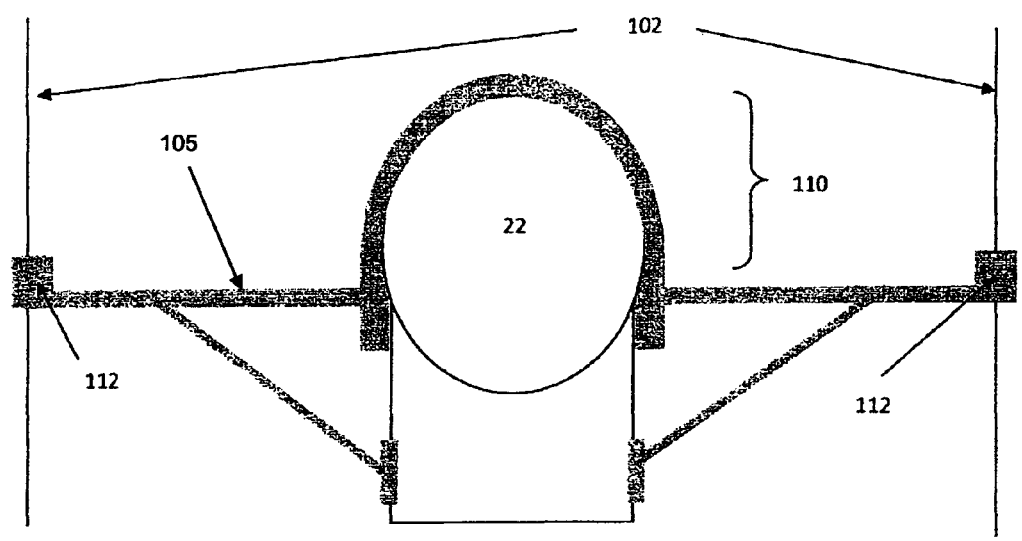
FIG. 11 is a cross-sectional view of an alignment tool for an underwater power generator.

FIGS. 10 and 11 depict an alternative method for guiding the connector portions 70, 72 together using auxiliary alignment cables 102 acting as a guide. Anchors 100 are lowered at the end of associated guidance cables 102 that are kept taught from a surface vessel, preferably the same device that is providing the lift/lower function. Various holes are provided in the base 14 for receiving the anchors 100 to allow for different alignment of the nacelle 22 of the generation unit 10.

An alignment tool 110 which has a snug interference fit with the nacelle 22 is arranged on the nacelle 22 and held in place by gravity. The alignment tool 110 has a pair of laterally extending arms 105 and is arranged on the nacelle 22 in an appropriate alignment. The alignment cables 102 run through guide apertures 112 at the end of each laterally extending arm 105. The guide apertures 112 have a large enough diameter to accept the guide cable 102 but are smaller than the anchors 100. Once the nacelle 22 is in place on the pylon 16, the anchors 100 are released from the base 14 and winched up. The anchors 100 can not pass through the guide apertures 112 so the alignment tool 110 is caught by the anchors 100 and lifted off the nacelle 22 and back to the surface. The lifting force imposed on the arms 105 of the alignment tool 110 also releases the snug gravity fit of the alignment tool 110 on the nacelle 22.

Although the invention has been described with reference to specific examples, it will be appreciated by those skilled in the art that the invention may be embodied in many other forms.

The invention claimed is:

1. A connector adapted to mount a power generation unit of an underwater power generator to a base assembly, the connector comprising:
    a lower connector portion adapted to be secured to the base assembly;
    an upper connector portion adapted to be secured to the power generation unit;
    at least one of the lower connector portion or the upper connector portion including a stem having a tapering profile, and the other of the lower connector portion or the upper connector portion including a tapering recess for receiving the stem; and
    a services connector configured to connect service cabling between the lower connector portion and the upper connector portion, the services connector including:
        a first services table having a first cable connector; and
        a second services table having a second cable connector corresponding to the first cable connector, at least one of the first services table or the second services table being a turntable configured to rotate relative to the other of the first services table or the second services table such that the first cable connector can be selectively aligned and coupled to the second cable connector when at least one of the first services table or the second services table is pressed toward the other of the first services table or the second services table.

2. The connector of claim 1, wherein the stem includes a radially outwardly projecting spline and the tapering recess includes a radially inwardly projecting spline configured to engage the outwardly projecting spline to inhibit axial rotation of the upper connector portion.

3. The connector of claim 1, wherein the stem is includes a first bearing surface and the tapering recess includes a second bearing surface configured to bear on a first bearing surface when the upper connector portion is lowered onto the lower connector portion.

4. The connector of claim 1, wherein the services connector is arranged internally of the connector.

5. The connector of claim 1, wherein the services connector is arranged externally of the connector.

6. An underwater power generator comprising:
    a base assembly;
    a generation unit adapted to be mounted on the base assembly; and
    a connector according to claim 1.

7. The connector of claim 1, wherein the lower connector portion includes the stem and the upper connector portion includes the tapering recess.

8. The connector of claim 1, further comprising:
    a substantially cylindrical pin configured to extend radially inward into the tapering recess, the stem having a groove configured to allow the pin to travel along the groove as the stem is axially inserted into the recess.

9. The connector of claim 1, wherein at least one of the first services table or the second services table includes a positioning pin and the other of the first services table or the second services table includes a positioning aperture configured to receive the positioning pin when at least one of the first services table or the second services table is pressed toward the other of the first services table or the second services table.

10. The connector of claim 9, wherein the positioning pin is one of a plurality of positioning pins and the positioning aperture is one of a plurality of positioning apertures, the plurality of positioning pins and the plurality of positioning apertures arranged asymmetrically on the first services table and the second services table such that the first services table can be coupled to the second services table in a single orientation.

11. The connector of claim 1, further comprising:
    a plurality of pins; and
    a plurality of grooves corresponding to the pins.

12. The connector of claim 11, wherein each groove from the plurality of groves extends from an opening to an end seat, and each pin from the plurality of pins are configured to rest in the end seat when the upper connector portion is lowered onto the lower connector portion.

* * * * *